(12) United States Patent
Friedrich et al.

(10) Patent No.: US 12,071,799 B2
(45) Date of Patent: Aug. 27, 2024

(54) SAFETY CONTACT STRIP

(71) Applicant: ASO GMBH ANTRIEBS-UND STEUERUNGSTECHNIK, Lippstadt (DE)

(72) Inventors: Helmut Friedrich, Lippstadt (DE); Nick Klause, Lippstadt (DE)

(73) Assignee: ASO GmbH Antriebs-und Steuerungstechnik, Lippstadt (DE)

( * ) Notice: Subject to any disclaimer, the term of this patent is extended or adjusted under 35 U.S.C. 154(b) by 562 days.

(21) Appl. No.: 17/050,619

(22) PCT Filed: Mar. 7, 2019

(86) PCT No.: PCT/DE2019/000057
§ 371 (c)(1),
(2) Date: Oct. 26, 2020

(87) PCT Pub. No.: WO2019/206348
PCT Pub. Date: Oct. 31, 2019

(65) Prior Publication Data
US 2021/0123284 A1 Apr. 29, 2021

(30) Foreign Application Priority Data
Apr. 27, 2018 (DE) .......................... 202018002133.4

(51) Int. Cl.
*E05F 15/44* (2015.01)
*F16P 3/14* (2006.01)
*H01H 3/16* (2006.01)

(52) U.S. Cl.
CPC .............. *E05F 15/44* (2015.01); *F16P 3/148* (2013.01); *H01H 3/16* (2013.01); *E05Y 2800/68* (2013.01)

(58) Field of Classification Search
CPC ......... E05F 15/44; E05F 15/443; E05F 15/42; E05F 15/46; F16P 3/148; B60J 10/86
See application file for complete search history.

(56) References Cited

U.S. PATENT DOCUMENTS

| | | | |
|---|---|---|---|
| 5,592,060 A | 1/1997 | Racine et al. | |
| 5,832,665 A * | 11/1998 | Miller | E05F 15/44 49/27 |
| 6,076,886 A * | 6/2000 | Petri | B60J 10/82 49/27 |

(Continued)

FOREIGN PATENT DOCUMENTS

| | | |
|---|---|---|
| DE | 8915613 U1 | 11/1990 |
| DE | 19525009 C1 | 10/1996 |

(Continued)

OTHER PUBLICATIONS

English translation of WO2010083800.*
English translation for DE102011107850 (Year: NA).*

*Primary Examiner* — Justin B Rephann
(74) *Attorney, Agent, or Firm* — Laurence A. Greenberg; Werner H. Stemer; Ralph E. Locher

(57) ABSTRACT

A co-extruded safety contact strip includes at least one contact or switching chamber situated in a section or profile and containing contactor or switching strips. One end of the base of the section is pivotally connected to a first side part and the other end of the base can be form-lockingly locked onto a second side piece. A method for securing the safety contact strip is also provided.

11 Claims, 2 Drawing Sheets

(56) References Cited

U.S. PATENT DOCUMENTS

| | | | |
|---|---|---|---|
| 6,740,826 B1 | 5/2004 | Friedrich et al. | |
| 8,112,940 B2 * | 2/2012 | Mayer | E06B 7/2309 |
| | | | 160/40 |
| 2013/0025211 A1 * | 1/2013 | Zaccaria | B60J 10/84 |
| | | | 49/498.1 |

FOREIGN PATENT DOCUMENTS

| | | | |
|---|---|---|---|
| DE | 29605719 U1 | 7/1997 | |
| DE | 10043514 A1 | 6/2002 | |
| DE | 102009005521 A1 | 7/2010 | |
| DE | 102011107850 B4 * | 7/2021 | ............. B60J 10/40 |
| WO | 0144611 A2 | 6/2001 | |
| WO | WO-2010083800 A2 * | 7/2010 | ............. E05F 15/44 |

* cited by examiner

SAFETY CONTACT STRIP

BACKGROUND OF THE INVENTION

Field of the Invention

The invention relates to a co-extruded safety contact strip having at least one contact chamber which is arranged within a section and has contactor strips.

Safety contact strips are known and proven in a variety of embodiments. They are usually used as closing edge securing means at pinch points and shearing points. When mounted on doors, machines and handling devices, such safety contact strips protect persons and material. For this purpose, the known safety contact strips are usually held on the base side in an aluminum carrier section, while the section extends further in the manner of a parabola over the base. In the case of deformation of this section, electrically conductive contactor strips then make contact, as a result of which a signal is output, for example in order to stop the movement sequence of a gate.

WO 01/44611 A2 discloses a safety contact strip of the generic type, in which the section, the contact chamber and the switching layers are formed in one piece as a co-extrudate from an electrically conductive plastic with in each case at least one embedded metal conductor.

The section, in the form of a parabola, of this safety contact strip has a base from which a mounting foot protrudes on the underside, which mounting foot is designed to be clamped or pushed into a C retaining section.

SUMMARY OF THE INVENTION

Even if this known safety contact strip has proven extraordinarily valuable over the years, there is still the need for a safety contact strip which can be used in as versatile a fashion as possible and which can be manufactured advantageously in terms of fabrication technology.

This technical problem is solved with a co-extruded safety contact strip having at least one contact chamber according to the invention, which is arranged within a section and has contactor strips, by virtue of the measure that one end of the base is pivotably connected to a first side part of the section, and that the base can be locked in a form-locking engaging fashion by the other end to the second side part.

The safety contact strip according to the invention provides the advantage that the interior of the section is accessible, at least in a wide area, so that, in said area, for example, cables or the like can be laid before and even during the mounting of the safety contact strip. On the other hand, the configuration of the base for different purposes is made possible in a simple way, as will be explained further below.

Therefore, in one preferred embodiment, there can be provision that, between the lockable end and the pivotable end, the base is composed at least partially from a harder plastic than the rest of the section. If a force acts on the safety contact strip according to the invention, such a relatively hard base will deform significantly less than the rest of the section, and the switching behavior of the safety contact strip is determined essentially by the shape of the section over the base. In a first refinement of the safety contact strip according to the invention, a mounting foot on the underside is formed by the base. Such a mounting foot can, for example, latch or be pushed onto or into an attachment section on the shearing edge.

However, in particular, the idea is that a planar supporting face is formed on the outside of the section by the base. This permits the safety contact strip according to the invention to be fitted directly onto a shearing edge. Special attachment sections are therefore not necessary.

Such a planar base can, for example, be bonded directly onto the closing edge. Additionally or alternatively, such a safety contact strip can be screwed to the closing edge. It has proven expedient for such an attachment with screws, if appropriate with pins, if the base has, within the section, at least one groove which runs in the longitudinal extent of the section and which facilitates the fitting of a screw. After the screwing on of the base of the safety contact strip, the rest of the section is then pivoted toward the base until the rest of the section form-lockingly engages with the base and the section is closed.

For the locking, latching projections and latching recesses are provided which can be embodied in such a way that the connection can be released again even when the safety contact strip is mounted, so that the interior of the section remains accessible. Alternatively, the latching connection can also be embodied in such a way that it can no longer be released non-destructively.

The location of the pivoting is expediently determined by a notch in the first side part so that a hinge-like pivoting area is formed there. In this respect, the base is at least then also formed partially by a comparatively soft plastic.

In one structural refinement of the safety contact strip according to the invention, it is also possible to provide ducts which run in the longitudinal extent of the section and serve, for example, to receive cables or the like and, in particular, to receive pins of an end cap.

If the base is embodied at least partially by means of a harder plastic than the rest of the section, the degrees of hardness of the plastics must be matched to the purpose of use.

At present it is appropriate that the soft plastic has a hardness of up to 70 Shore A and the hard plastic has a hardness of up to 45 Shore D.

The essence of the invention is explained in more detail with reference to the drawing, in which cross sections are represented in an exemplary fashion and are not true to scale.

DETAILED DESCRIPTION OF THE INVENTION

Figure 1:
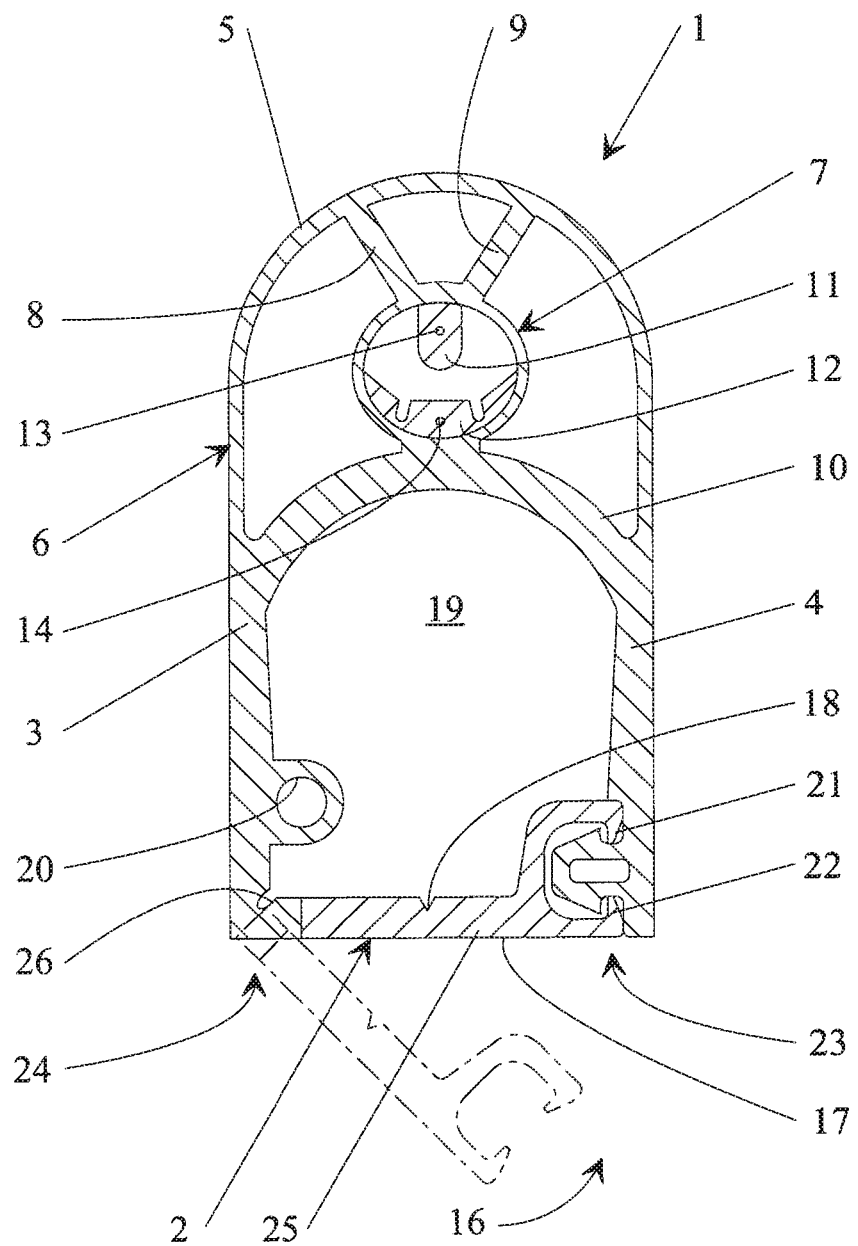
FIG. 1 shows a first exemplary embodiment of a safety contact strip.

The safety contact strip 1 represented in FIG. 1 has two side parts 3, 4 which are connected to a base 2 and are closed on the upper side by an arc 5. Within the section 6 which is formed in this way, a contact chamber 7 is secured to webs 8-10 here, by way of example free from the inner walls of the section 6. In this context, the arcuate web 10 has approximately the same material thickness as the side parts 3, 4, while the arc 5 and the webs 8, 9 have a material thickness which is significantly reduced in comparison. In the contact chamber 7, two electrically conductive contactor strips 11, 12, each with an embedded metallic conductor 13, 14, are embodied in a conventional fashion from a non-conductive plastic by means of a co-extrudate.

The base 2 is pivotably connected to the side part 3, indicated by dot-dash lines and by the arrow 16. Stress in the corner region of the side part 3 and of the base 2 caused by the pivoting does not affect the functioning of the contact chamber 7 here, since a switching function is triggered by loading the comparatively thin arc 5 via the webs 8, 9.

Since, in this exemplary embodiment, the underside of the base 2 is smooth and configured in a planar fashion, this forms a supporting face 17 which can be fitted directly onto a closing edge without the need for a retaining strip.

In particular, in this context, the idea is to tightly screw the safety contact strip 1 to the closing edge. This is done in a simple way with the base 2 opened, in that the tips of screws are fitted here in a groove 18 with a V-shaped cross section. Since the interior 19 of the safety contact strip 1 is then accessible during mounting, cables, light strips such as LED rows or the like can be laid with less difficulty.

This may, under certain circumstances, also be done in ducts 20 which extend in the longitudinal direction of the section 6.

If such preliminary work is concluded, the rest of the section can be pivoted against the secured base 2 and the safety contact strip 1 can be closed. The free end 23 of the base 2 then form-lockingly engages with the second side part 4. For this purpose, in the exemplary embodiment, two latching projections 21, 22 are provided, which lock in corresponding latching recesses in the second side part 4.

In order, on the one hand, to permit secure screwing to a closing edge and in order, on the other hand, to brace the side parts in a spaced-apart fashion, a section 25 of the base 2 is co-extruded, between its free end 23 and the opposite end 24 with the pivoting area, from a harder plastic than the plastic of the rest of the section 6.

The pivoting area of the base 2 opposite the first side part 3 is, however, formed in the exemplary embodiment by means of a soft plastic which facilitates the formation of this pivoting area. In addition, a notch 26 defines this pivoting area.

Figure 2:
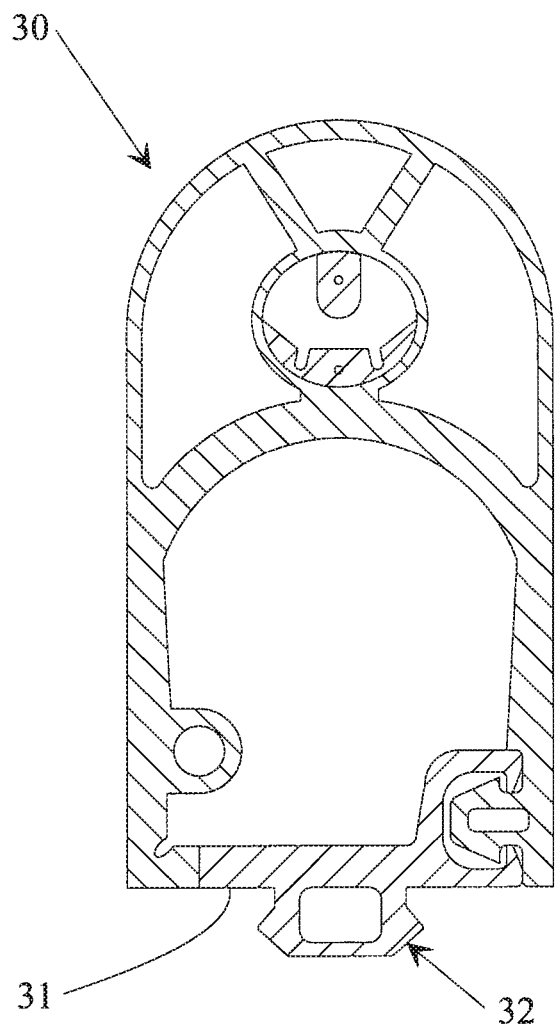
FIG. 2 shows a second exemplary embodiment of a safety contact strip.

The exemplary embodiment of the safety contact strip according to FIG. 2 differs from the above only in respect of the embodiment of the base 31 with a mounting foot 32 which is pressed or pushed into a retaining section in a conventional fashion.

Alternatively, a mounting foot can also be embodied in the manner of a clamp and grasp a retaining section and lock said mounting foot to the latter.

The invention claimed is:

1. A co-extruded safety contact strip, comprising:
a co-extruded section, said co-extruded section including a planar base having two ends, and said co-extruded section including first and second side parts;
one of said ends of said base having a hinged pivoting area formed by a notch in said first side part, causing said one of said ends to be pivotably connected to said first side part and permitting said base to be pivoted between an open condition and a closed condition, and another of said ends of said base being configured to be form-lockingly engaged to said second side part;
said base configured to be attached in said open condition to a closing edge and moved to said closed condition by pivoting said co-extruded section; and
at least one permanently-closed contact chamber disposed inside said section, said at least one permanently-closed contact chamber having contactor strips disposed in said at least one permanently-closed contact chamber.

2. The safety contact strip according to claim 1, wherein said base is at least partially composed, between said two ends, of a harder plastic than a remainder of said section.

3. The safety contact strip according to claim 1, wherein said base has an underside and a mounting foot formed on said underside.

4. The safety contact strip according to claim 1, wherein said base has a planar supporting face formed on an outside of said section.

5. The safety contact strip according to claim 1, wherein said base has at least one groove with a V-shaped cross section disposed within said section and running in a longitudinal extent of said section.

6. The safety contact strip according to claim 1, which further comprises latching projections and latching recesses providing said form-locking engagement.

7. The safety contact strip according to claim 1, which further comprises ducts running in a longitudinal extent of said section.

8. The safety contact strip according to claim 1, wherein said base is at least partially composed, between said two ends, of a harder plastic than a remainder of said section, and said remainder of said section is formed of a soft plastic having a hardness of up to 70 Shore A.

9. The safety contact strip according to claim 1, wherein said base is at least partially composed, between said two ends, of a harder plastic than a remainder of said section, and said harder plastic has a hardness of up to 45 Shore D.

10. The safety contact strip according to claim 1, wherein:
said base is at least partially composed, between said two ends, of a harder plastic than a remainder of said section;
said remainder of said section is formed of a soft plastic having a hardness of up to 70 Shore A; and
said harder plastic has a hardness of up to 45 Shore D.

11. A method for securing a safety contact strip, the method comprising:
providing the safety contact strip according to claim 1;
fitting the base, in said open condition, on the closing edge;
bonding, screwing or pinning the open base to the closing edge; and
closing the safety contact strip by pivoting the section.

* * * * *